United States Patent [19]
Mitsuhashi

[11] Patent Number: 5,311,303
[45] Date of Patent: May 10, 1994

[54] IMAGE PROCESSING APPARATUS HAVING A MEMORY FOR STORING INFORMATION RELATING TO COLOR

[75] Inventor: Shunya Mitsuhashi, Tokyo, Japan

[73] Assignee: Canon Kabushiki Kaisha, Tokyo, Japan

[21] Appl. No.: 773,422

[22] Filed: Oct. 9, 1991

[30] Foreign Application Priority Data

Oct. 12, 1990 [JP] Japan .................................. 2-272162

[51] Int. Cl.⁵ .............................................. G06F 3/153
[52] U.S. Cl. ...................................... 348/32; 358/539; 348/717
[58] Field of Search ..................................... 358/75–80, 358/89, 539, 518–521; 340/703, 701

[56] References Cited

U.S. PATENT DOCUMENTS

| | | | |
|---|---|---|---|
| 4,680,626 | 7/1987 | Deering et al. | 358/75 |
| 4,723,129 | 2/1988 | Endo et al. | 346/1.1 |
| 4,740,833 | 4/1988 | Shiota et al. | 358/80 |
| 4,751,446 | 6/1988 | Pineda et al. | 358/89 |
| 4,799,053 | 1/1989 | Van Aken et al. | 340/703 |
| 4,818,979 | 4/1989 | Manson | 340/723 |
| 4,928,167 | 5/1990 | Tatsumi et al. | 358/80 |
| 4,942,461 | 7/1990 | Abe et al. | 358/75 |
| 5,038,300 | 8/1991 | Seiber et al. | 261/521 |

FOREIGN PATENT DOCUMENTS

104332 4/1984 European Pat. Off. ..... G06K 15/10
425253 5/1991 European Pat. Off. ..... G06K 15/00

OTHER PUBLICATIONS

Patent Abstracts of Japan vol. 8, No. 231 (Kokai 59-111472) (Jun. 1984).
Patent Abstracts of Japan vol. 13, No. 36 (Kokai 63-246263) (Oct. 1988).

*Primary Examiner*—Stephen Brinich
*Attorney, Agent, or Firm*—Fitzpatrick, Cella, Harper & Scinto

[57] ABSTRACT

At the time of registration, an image processing apparatus registers color information (R, G, B) from a host computer as permanently registered information in a buffer and as temporarily registered information in a table in accordance with a command from the host computer. The data registered in the buffer also is registered in the table and is used as internal data until initialization is performed. At the time of initialization, the data registered in the table is initialized with the exception of the data that has been registered from the buffer, if the command is indicative of a soft reset. In case of a hard reset, all of the data in the table is initialized.

38 Claims, 6 Drawing Sheets

| TABLE NO.#1 | REGISTRATION LEVEL | R1 | G1 | B1 | 221 |
|---|---|---|---|---|---|
| #2 | REGISTRATION LEVEL | R2 | G2 | B2 | |
| #3 | REGISTRATION LEVEL | R3 | G3 | B3 | |
| ⋮ | | ⋮ | ⋮ | ⋮ | |
| #n | REGISTRATION LEVEL | Rn | Gn | Bn | |

FIG. 2

IMAGE PROCESSING APPARATUS HAVING A MEMORY FOR STORING INFORMATION RELATING TO COLOR

BACKGROUND OF THE INVENTION

1. Field of the Invention

This invention relates to an image processing apparatus and, more particularly, to an image processing apparatus having memory means, which is referred to as a color table, color palette or the like, for storing information relating to color.

2. Description of the Prior Art

A conventional color recording apparatus such as a color printing apparatus disclosed in U.S. patent application Ser. No. 07/602,697 filed on Oct. 24, 1990, has a memory means for storing information relating to color, which is referred to as a color table, color palette or the like.

In the conventional apparatus of this kind, the contents of the memory means referred to as the color table or color palette for storing information relating to color always is initialized by an initializing command from a host computer or by a reset operation performed at a control panel. As a consequence, even if the contents currently stored in the memory means have been registered personally by the user, the information relating to color must be re-registered whenever initialization is performed, or the contents that have been stored must be saved temporarily in another area before initialization. This constitutes a drawback in the conventional apparatus.

SUMMARY OF THE INVENTION

An object of the present invention is to provide an image processing apparatus in which the foregoing drawback of the prior art can be eliminated.

That is, the object of the present invention is to provide an image processing apparatus in which registration of a color code can be made easy.

To achieve the object, the present invention discloses an image processing apparatus comprising receiving means for receiving a color code and data of a plurality of color components corresponding to the color code and command relating to storing the data, and memory means for storing the data of color components in accordance with the command data.

A further object of the present invention is to provide an image processing apparatus in which memory control can be efficient.

To achieve the object, the present invention discloses the image processing apparatus comprising memory means for storing data of a plurality of color components corresponding to an input color code with registration level data, and control means for cancelling the data of a plurality of components in accordance with the registration level data.

A further object of the present invention is to provide a controller in which a special command can be managed.

To achieve the object, the present invention discloses a controller for receiving code data and outputting print data to a printer, comprising receiving means for receiving a plurality of kinds of reset commands from an external device, and processing means for performing data processing in accordance with one of the reset commands.

A further object of the present invention is to provide an image processing apparatus in which registration processing and initialization processing can be controlled in conformity with the reset level, such as a hard reset or a soft reset.

A further object of the present invention is to provide an image processing apparatus in which the content of data personally registered by the user can be preserved even though initialization is performed.

A further object of the present invention is to provide an image processing apparatus in which it is unnecessary to perform a troublesome operation such as saving, in another location, the content of data personally registered by the user at the time of initialization.

Still another object of the present invention is to provide an image processing apparatus having a function for registering data, at least at first and second registration destinations, comprising first input means for inputting, at the time of registration, data accompanied by registration information, which indicates one of the first and second registration destinations, first registration means for registering the data, inputted by the first input means, in the first or second registration destination in accordance with the registration information accompanying this data, second registration means for registering data, which has been recorded at the first registration destination by the first registration means, also in the second registration destination, second input means for inputting an initializing command, which indicates one of at least the first and second initializing methods, at initialization of the data registered by the second registration means, total initializing means for initializing all of the data registered by the second registration means in a case where the initializing command inputted by the second input means corresponds to the first initializing method, and partial initializing means for initializing only the data registered by the first registration means among the data registered by the second registration means in a case where the initializing command inputted by the second input means corresponds to the second initializing method.

Other features and advantages of the present invention will be apparent from the following detailed description of embodiments of the present invention with reference to the accompanying drawings.

BRIEF DESCRIPTION OF THE DRAWINGS

FIG. 2 is a diagram illustrating the structure of a color table shown in FIG. 1;

DESCRIPTION OF THE PREFERRED EMBODIMENT

A preferred embodiment of the invention will now be described in detail with reference to the accompanying drawings.

Figure 1:
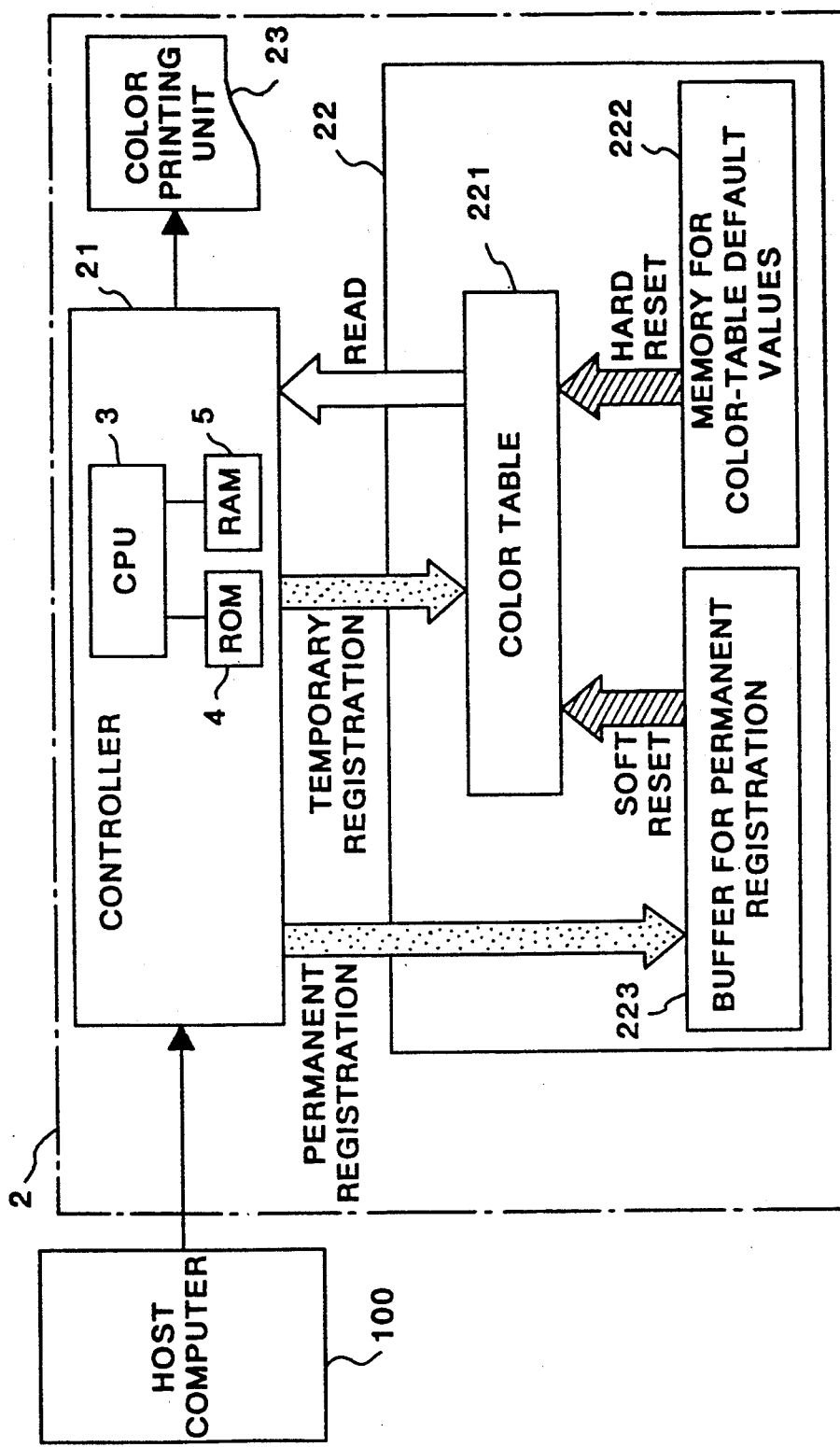
FIG. 1 is a block diagram illustrating the construction of a color recording apparatus according to an embodiment of the present invention.

FIG. 1 is a block diagram illustrating the construction of a color recording apparatus according to an embodiment of the invention.

As shown in FIG. 1, numeral 100 denotes a host computer for outputting printing information, which comprises print data (character code, image data or the like), a control code including a color code for color assignment, and a command for registration of a color component data corresponding to a color code or the like, to a recording apparatus 2. The recording apparatus 2 includes a controller 21, a memory unit 22 and a color printing unit 23. The controller 21 includes control means in accordance with the present invention. The memory unit 22 includes a color table 221 serving as memory means according to a feature of the invention, as well as a memory 222 for color-table default values, and a buffer 223 for permanent registration. These memories serve as working areas for color-table initialization and registration update. The memory 222 is constituted by a ROM or a RAM comprising a circuit for back-up.

The color printing unit 23 is a color printing mechanism for forming a permanent visible image on recording paper based upon printing information read from the host computer 100. For example, the color printing unit 23 is constituted by an electrophotography printer (laser beam printer) for forming and visualizing a latent image on photoreceptor.

Figure 3:
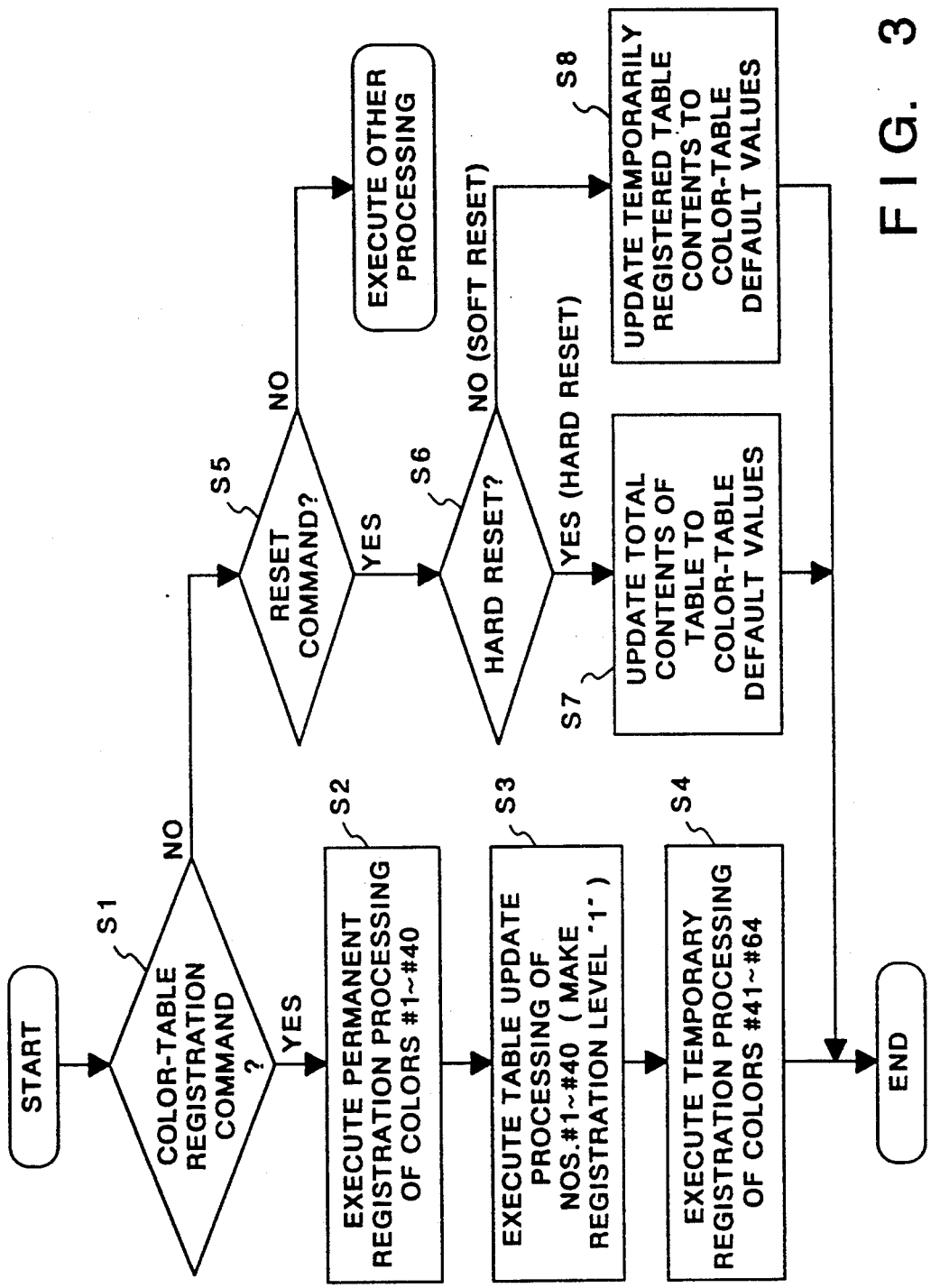
FIG. 3 is a flowchart for describing registration and reset processing performed by a CPU according to this embodiment.
Figure 4:
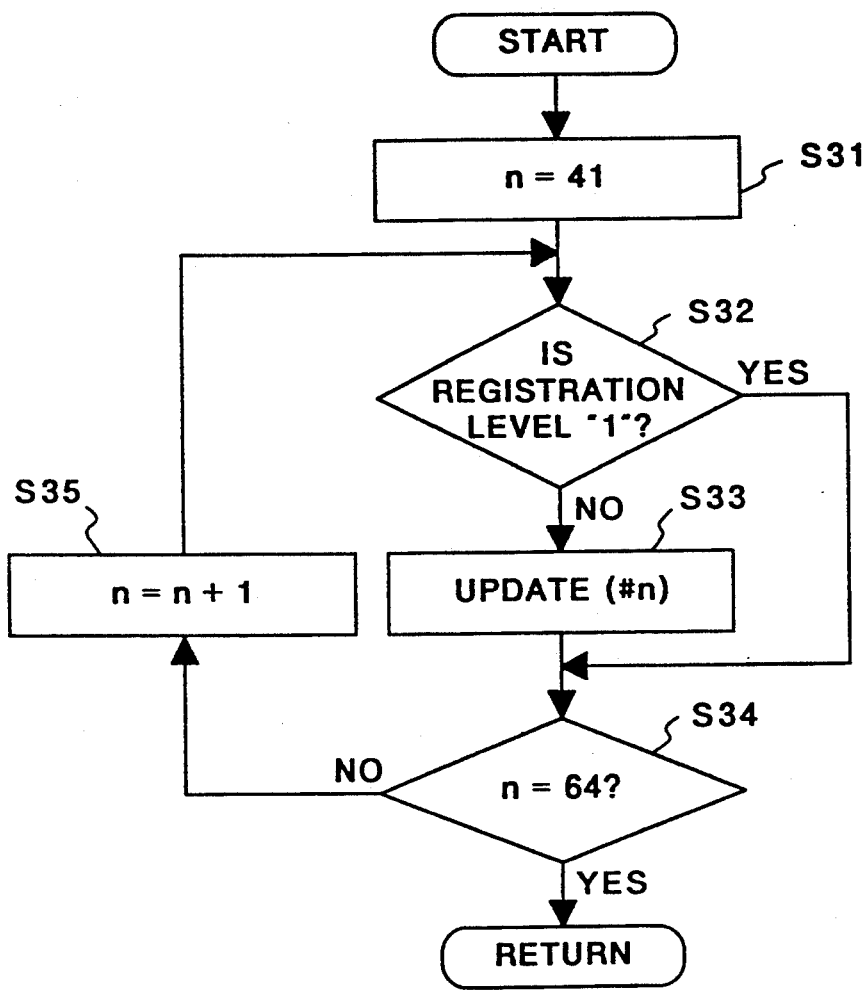
FIG. 4 is a flowchart for describing temporary registration processing performed by a CPU according to this embodiment.

The controller 21 has a CPU 3 for executing the actual control operation, a ROM 4 which stores programs executed by the CPU 3, that are in accordance with the flowcharts of FIGS. 3 and 4, and a RAM 5 used as the working area of each program and as an area for temporarily saving data at the time of error processing.

FIG. 2 is a diagram showing the structure of the color table 221 illustrated in FIG. 1. The color table 221, which is placed in a rewritable random-access memory, has areas for storing the values of standard RGB components serving as color information indicative of color, and areas for storing information relating to registration levels, described below. More specifically, the color table 221 stores, in correlation with table numbers #1 through #n, registration levels indicated by 0 or 1, whether rewriting (updating) is allowed or is not, respectively, and color information (R1, G1, B1) through (Rn, Gn, Bn).

The operation of this embodiment will now be described.

FIG. 3 is a flowchart for describing registration and reset processing executed by the CPU 3 according to this embodiment, and FIG. 4 is a flowchart for describing temporary registration processing executed by the CPU 3 according to this embodiment.

First, the user's own colors (RGB components data) are permanently registered (the registration level is made "1") at numbers 1 through 40 in color table 221 by a color-table registration command from the host computer 100. At this time the host computer 100 makes a permanent registration of registration level "1", which is one of the parameters of the color-table registration command, and outputs the command. In addition, the user's own colors (the data of RGB components) are temporarily registered (the registration level is made "0") at numbers 41 through 64 of the color table 221. In this case, the host computer 100 makes a temporary registration of registration level "0", and outputs the command.

More specifically, in response to receipt of the color-table registration command from the host computer 100 at step S1 in the flowchart of FIG. 3, the controller 21 temporarily stores the color information from table numbers #1 through #40 in the permanent registration buffer 223 at step S2, after which the controller 21 updates the contents of table numbers #1 through #40 in the color table 221 using the color information of table numbers #1 through #40 stored in the buffer. At this time, the registration level of each updated table number is set to "1" at step S3. The controller 21 then stores the color information of table numbers #41 through #64 directly in the color table 221 at step S4.

In the temporary registration of table numbers #41 through #64 at step S4, a counter indicated by n is set to 41 at step S31 in FIG. 4. If the registration level of table number #n is "1", control is executed in such a manner that the content of this table number is not updated (step S32). If the registration level is not "1", on the other hand, the contents of the color table 221 are updated by the color information from the host computer 100 at step S33. This operation is repeated in this fashion until n=64 is attained. When the operation ends at n=64, the processing returns to FIG. 3.

Thus, the controller 21 executes control to portion out the storage destinations of the color information, depending upon the indication of the registration level from the host computer 100, and the contents of the registration levels of the color table, and updates the contents of the areas of the color table 221.

A case where the apparatus is initialized will now be described.

First, in the initialization operation, it is assumed that several resetting commands have been prepared in dependence upon the range over which the initialization is to be made. Two types of reset are utilized, namely a hard reset and a soft reset. The former returns memorized contents of the color table 221 to default values stored in the memory 222 and clears the buffer 223. The latter preserves permanently registered information, such as color palette data fonts or the like downloaded through the buffer 223 in color table 221 and user-defined patterns, and clears temporarily registered information (the registration level "0").

Accordingly, when a command from the host computer 100 is indicative of the hard reset (steps S5 and S6 in FIG. 3), all of the contents of the color table 221 are updated at step S7 by the contents of the color-table default-value memory 222 in which the color-table default values have already been registered. Then the registration level is "0". When the command is indicative of the soft reset, on the other hand, control is performed in such a manner that only the temporarily registered contents (the registration level "0") are updated by the contents of the memory 222 for the color-table default values; table contents for which the registration level is "1" are not updated (step S8). According to the soft reset, therefore, the contents of numbers #1 through #40 are preserved and the contents of numbers #41–#64 are initialized.

As a result of the foregoing processing, the user is capable of preserving the permanently registered color table 221 even if other parameters in the apparatus are initialized. In addition, the color table 221 can be utilized more efficiently depending upon the combination of the registration level and reset level.

In the description of the flowchart given above, a method of holding a color-table registration command or reset command sent from the host computer 100 is not discussed. In this embodiment, however, it is assumed the command is stored in the RAM 5, regardless of its type. Further, though no illustration is given in FIG. 3, an operation for erasing the color-table registration command or reset command is included in the processing in each of steps S4, S7 and S8.

In the embodiment described above, the buffer 223 for permanent registration is provided, besides the color table 221, as a working area. However, this area need not necessarily be provided. In addition, the memory area of FIG. 1 which includes the color table 221 need not be a RAM or ROM, for an external storage device such as a hard disk may be used instead.

Further, the color printing unit 23 may be a color laser-beam printer, a color ink-jet printer, a color thermal-transfer printer or a color dot printer.

In particular, the ink-jet printer includes a so-called bubble jet printer, of the type in which it utilizes the jet's liquid droplets by film boiling that relies upon thermal energy.

Thus, in accordance with the present invention as described above, when recording is performed by employing a user's own color table, initialization of the color table can be utilized efficiently and in a very convenient manner.

A modification of the foregoing embodiment will now be described.

Figure 5:
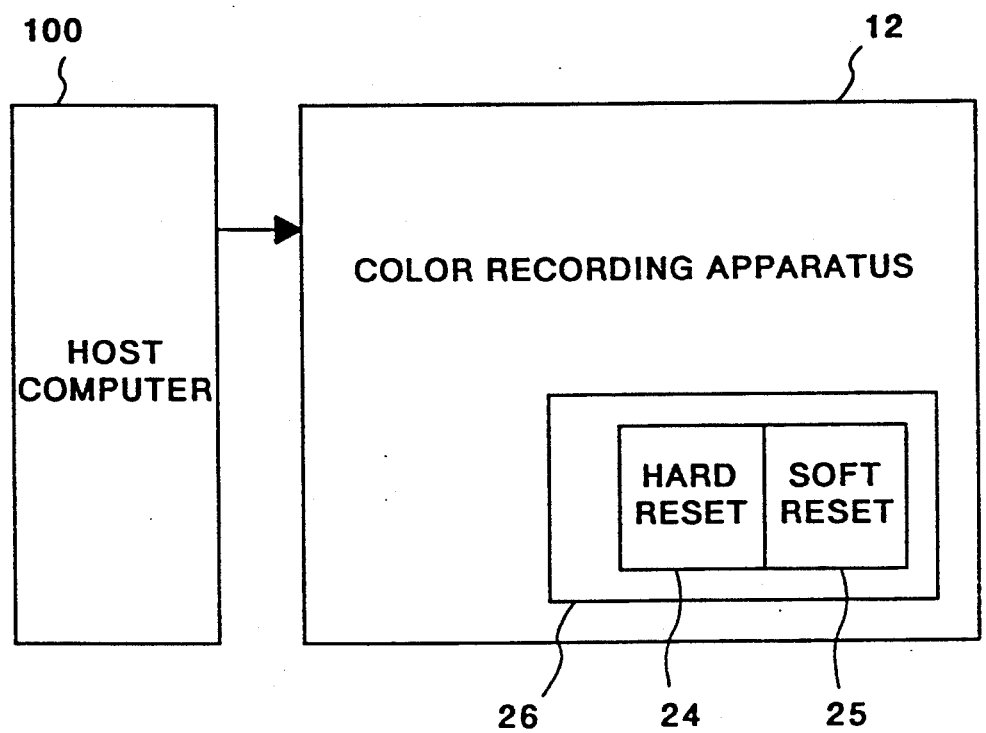
FIG. 5 is a block diagram illustrating a modification of the color recording apparatus of this embodiment.
Figure 6:
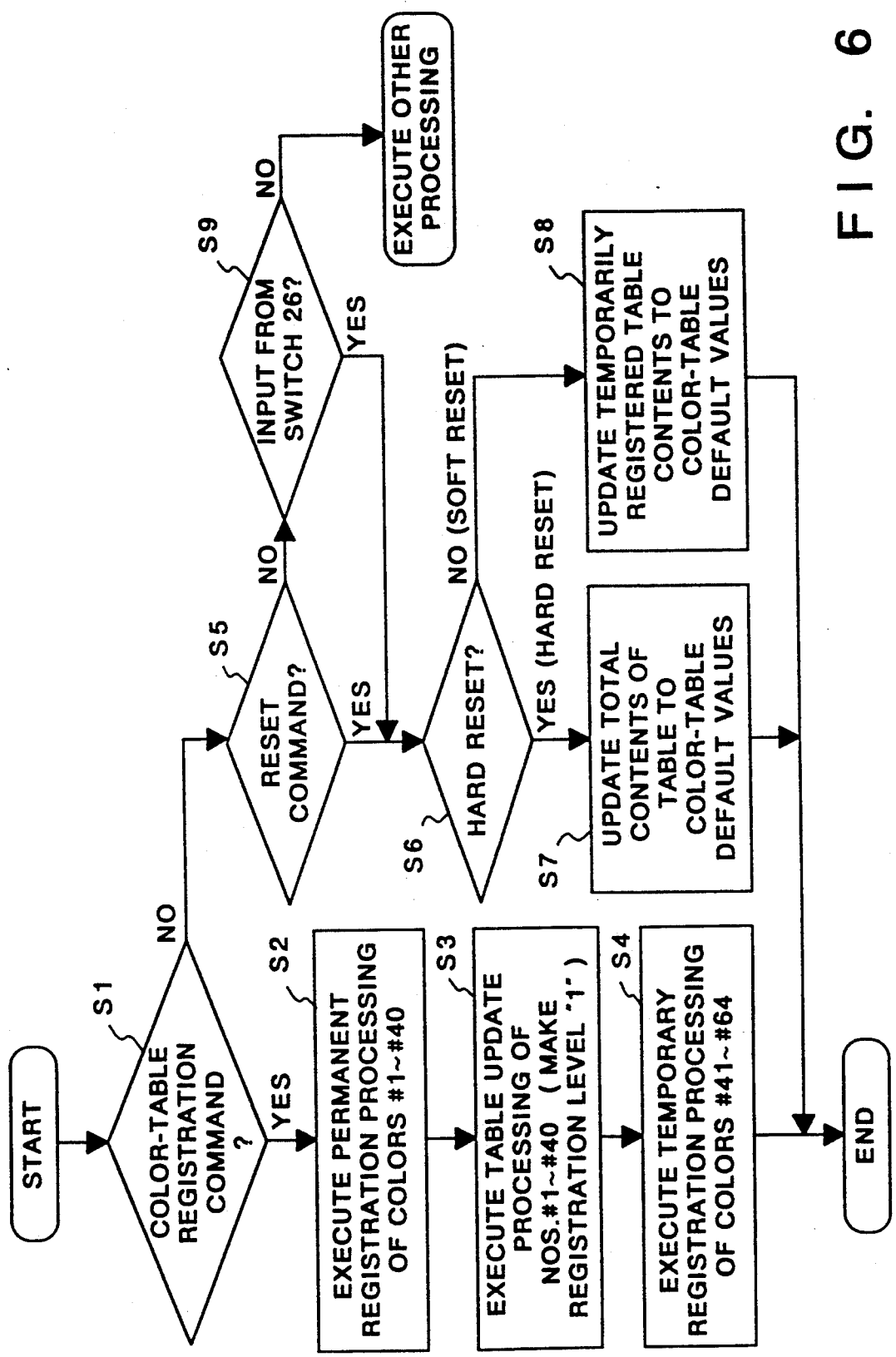
FIG. 6 is a flowchart for describing registration and reset processing performed by the CPU in the arrangement of FIG. 5.

FIG. 5 is a block diagram illustrating a modification of the color recording apparatus of this embodiment, and FIG. 6 is a flowchart for describing registration and reset processing performed by the CPU in the arrangement of FIG. 5.

In FIG. 5, a color recording apparatus 12 in this modification includes the arrangement of FIG. 1 and the reset switches 24 and 25 on an operation panel 26 provided with the apparatus 12. The switches 24 and 25 are electrically connected to the controller in apparatus 12. As for the signals applied to the controller 21, information similar to the reset command described in the foregoing embodiment is delivered. Specifically, the foregoing embodiment does not deal with a case in which the color recording apparatus 2 executes the resetting operation itself, merely by receiving a reset command from the host computer 100. By contrast, this modification is adapted so that the color recording apparatus 12 is itself capable of performing a resetting operation similar to that of the foregoing embodiment.

The operation of this modification will be described with reference to FIG. 6.

In this modification, also as in the foregoing embodiment, a color-table registration command and a reset command are received from the host computer 100. Since the operations in accordance with each of these commands have already been described in connection with FIG. 3, they need not be described again. The difference between FIG. 3 and FIG. 6, which illustrates the operation of this modification, is step S9. As shown in FIG. 6, this step follows step S5, which is for determining whether the reset command has been received from the host computer 100. Step S9 is for sensing an input from the operation panel 26. If the user presses reset switches 24 or 25 to enter the hard or soft reset command, reset switches 24 or 25 sends a signal indicative of whether or not the reset is to be made to the RAM 5 of the controller in the apparatus 12. This signal is stored in an area different from the area in which the command from the host computer 100 is stored. Based upon the stored reset command, the CPU determines whether the reset command is indicative of the hard or soft reset. The operation from this determination step onward is similar to that of the foregoing embodiment and need not be described again. Furthermore, step S7 or S8 includes an operation for erasing the reset command from the RAM 5 after each updating processing operation ends.

Thus, it is possible for the color recording apparatus 12 to perform the resetting operation even by itself without starting up the host computer 100. This makes the resetting operation even simpler than that in the foregoing embodiment.

The signal corresponding to the hard reset switch 24 may be provided from a circuit switch of the apparatus 12. Furthermore, a single switch can be provided and adapted to select either the hard or soft resetting operation in accordance with the number of switching.

Furthermore, storing color components is not limited to RGB components; it can include Y(Yellow), M(Magenta), C(Cyan) components or Y, I, Q components or L*,a*,b* components.

In addition, according to the above-mentioned embodiment, a memory area is divided into table numbers #1–#40 and table numbers #41–#64. However, the data of color components can also be stored at random.

Further, it is also in the spirit and scope of the present invention that either of table numbers #1–#40 and table numbers #41–#64 can be reset by a predetermined command A, and that table numbers #1–#64 can be reset by a predetermined command B.

In addition, the number of reset commands is not limited to two, but can be increased in accordance with the number of sections in the memory. That is, in a case where the memory is divided to three sections of A, B and C, four kinds of commands can be provided, including all reset command in addition to the reset commands corresponding to sections A, B and C.

Furthermore, the command is not limited a color command; it can be a command such as a font registration command.

As many apparently widely different embodiments of the present invention can be made without departing from the spirit and scope thereof, it is to be understood that the invention is not limited to the specific embodiments thereof, except as defined in the appended claims.

What is claimed is:

1. An image processing apparatus comprising:
   receiving means for receiving a plurality of color component data represented by a plurality of color codes and a command relating to storing the data; and
   memory means for storing the data in accordance with said command,
   wherein said memory means is capable of storing data represented by a plurality of the color codes, and said command relates to storing a part of the plurality of color codes.

2. The apparatus according to claim 1, wherein said color components includes Red, Green and Blue.

3. The apparatus according to claim 1, wherein said command relates to a registration level of the data.

4. The apparatus according to claim 3, wherein said registration level includes a first and a second level, a data stored by the first level does not rewrite by a predetermined command, but a data stored by the second level rewrites by said predetermined command.

5. The apparatus according to claim 1, wherein said memory means comprises a look-up table.

6. The apparatus according to claim 1, further comprising a ROM for storing data of color component corresponding to default values.

7. The apparatus according to claim 4, wherein said predetermined command is inputted from a host computer.

8. The apparatus according to claim 4, wherein said predetermined command is manually inputted by an operator.

9. An image processing apparatus comprising:
   memory means for storing a plurality of color component data represented by a plurality of input color codes with registration level data; and
   control means for cancelling the data in accordance with the registration level data,
   wherein said control means cancels a part of the data represented by a part of the plurality of input color codes in accordance with the registration level data.

10. The apparatus according to claim 9, wherein said color components includes Red, Green and Blue.

11. The apparatus according to claim 9, wherein said registration level data includes a first and a second level, a data stored by the first level is not cancelled by a predetermined command, but a data stored by the second level rewrites by said predetermined command.

12. The apparatus according to claim 9, wherein said memory means comprises a look-up table.

13. The apparatus according to claim 9, further comprising a ROM for storing data of color component corresponding to default values.

14. The apparatus according to claim 11, wherein said predetermined command is inputted from a host computer.

15. The apparatus according to claim 11, wherein said predetermined command is manually inputted by an operator.

16. An image processing method comprising the steps of:
   inputting a command which commands rewriting of data stored in a memory means;
   discriminating whether data of a plurality of color components stored in the memory means should be rewritten or not, the data of color components corresponding to a color code; and
   rewriting data of a plurality of color components stored in the memory means in accordance with the discrimination result,
   wherein the discrimination is performed code by code in accordance with the command.

17. The method according to claim 16, wherein said color components include Red, Green and Blue.

18. The method according to claim 16, wherein said memory means is look-up table.

19. The method according to claim 16, wherein said discrimination is performed on the basis of registration level data stored in said memory means together with said data of color components.

20. The method according to claim 19, wherein said registration level data includes a first and a second level; the first level does not permit to rewrite, the second level permits to rewrite.

21. An image processing apparatus having a function for registering data at least at first and second registration destinations, comprising:
   first input means for inputting, at the time of registration, data accompanied by registration information which indicates one of said first and second registration destinations;
   first registration means for registering the data, inputted by said first input means, in said first or second registration destination in accordance with the registration information accompanying this data;
   second registration means for registering data, which has been registered at said first registration destination by said first registration means, also in said second registration destination;
   second input means for inputting an initializing command, which indicates one of at least first and second initializing methods, at initialization of the data registered by the second registration means;
   total initializing means for initializing all of the data registered by said second registration means in a case where the initializing command inputted by said second input means corresponds to the first initializing method; and
   partial initializing means for initializing only the data registered by said first registration means, among the data registered by said second registration means, in a case where the initializing command inputted by said second input means corresponds to the second initializing method.

22. The apparatus according to claim 21, further comprising determination means for determining, based upon an externally applied command, whether it is time for registration or time for initialization.

23. The apparatus according to claim 22, wherein the externally applied command includes a signal indicative of either said total initializing means or partial initializing means, and said determination means includes initialization determination means which, when it is determined to be time for initialization, determines whether said total initializing means or partial initializing means is to be executed.

24. The apparatus according to claim 22, further comprising internal determination means for determining, based upon an internal signal, whether it is time for initialization.

25. The apparatus according to claim 24, wherein the internal signal includes a signal indicative of either said total initializing means or partial initializing means, and said internal determination means includes initialization determination means which determines whether said total initializing means or partial initializing means is to be executed.

26. The apparatus according to claim 25, further comprising a switch for generating the internal signal.

27. The apparatus according to claim 21, wherein said first registration destination is a hard disk.

28. The apparatus according to claim 21, wherein said second registration destination is a RAM.

29. The apparatus according to claim 21, wherein said second registration destination is a table.

30. A controller for receiving code data and outputting print data to a printer, said controller comprising:
   receiving means for receiving a plurality of kinds of a reset command from an external device; and processing means for performing data processing in accordance with the kind of reset command which is received.

31. The controller according to claim 30, wherein said reset command includes hard reset and soft reset commands.

32. The controller according to claim 30, wherein said processing means has memory means for storing data of a plurality of color components corresponding to a color code.

33. The controller according to claim 32, wherein said reset command is a command for resetting said memory means.

34. The controller according to claim 33, wherein said reset command includes a first and a second reset command; the first reset command resets all content in said memory means, while the second reset command resets a part of the content in said memory means.

35. An image processing apparatus comprising:

memory means for storing a plurality of color component data represented by a plurality of color codes; and controlling means for resetting the plurality of color component data, and subsequently setting predetermined default data of the plurality of color component data, wherein said controlling means resets a part of the data represented by the plurality of color codes and subsequently sets the predetermined default data.

36. The apparatus according to claim 35, said controlling means performs said resetting and setting on the basis of command data from an external device.

37. The controller according to claim 36, wherein said command data includes hard reset data and soft reset data.

38. The controller according to claim 35, wherein said default data is stored in a ROM.

* * * * *

UNITED STATES PATENT AND TRADEMARK OFFICE
CERTIFICATE OF CORRECTION

PATENT NO. : 5,311,303
DATED : May 10, 1994
INVENTOR(S) : SHUNYA MITSUHASHI

It is certified that error appears in the above-identified patent and that said Letters Patent is hereby corrected as shown below:

COLUMN 1

Line 10, "memory" should read --a memory--.

COLUMN 6

Line 66, "components includes" should read --component data include--.

COLUMN 7

Line 28, "components includes" should read --component data include--.
Line 62, "look-up" should read --a look-up--.

COLUMN 10

Line 11, "said" should read --wherein said--.
Line 14, "controller" should read --apparatus--.
Line 17, "controller" should read --apparatus--.

Signed and Sealed this

Ninth Day of May, 1995

BRUCE LEHMAN

Attest:

Attesting Officer

Commissioner of Patents and Trademarks